(12) United States Patent
Sutton et al.

(10) Patent No.: US 9,855,731 B2
(45) Date of Patent: Jan. 2, 2018

(54) RESIN-BASED PANEL WITH ENCAPSULATED HIGH-RESOLUTION IMAGE LAYER AND METHODS OF MAKING SAME

(71) Applicant: 3Form, LLC, Salt Lake City, UT (US)

(72) Inventors: Matthew T. Sutton, Salt Lake City, UT (US); John E. C. Willham, Sandy, UT (US)

(73) Assignee: 3FORM, LLC, Salt Lake City, UT (US)

( * ) Notice: Subject to any disclaimer, the term of this patent is extended or adjusted under 35 U.S.C. 154(b) by 0 days.

(21) Appl. No.: 14/070,182

(22) Filed: Nov. 1, 2013

(65) Prior Publication Data

US 2014/0220317 A1 Aug. 7, 2014

Related U.S. Application Data

(60) Provisional application No. 61/721,326, filed on Nov. 1, 2012.

(51) Int. Cl.
| | |
|---|---|
| *B32B 37/06* | (2006.01) |
| *B32B 27/08* | (2006.01) |
| *B32B 7/12* | (2006.01) |
| *B32B 27/30* | (2006.01) |
| *B32B 27/36* | (2006.01) |

(Continued)

(52) U.S. Cl.
CPC ............... *B32B 37/06* (2013.01); *B32B 7/12* (2013.01); *B32B 27/08* (2013.01); *B32B 27/308* (2013.01); *B32B 27/36* (2013.01); *B32B 27/365* (2013.01); *B32B 27/40* (2013.01); *B32B 37/182* (2013.01); *B32B 37/1009* (2013.01); *B32B 2037/1223* (2013.01); *B32B 2250/40* (2013.01); *B32B 2307/4023* (2013.01); *B32B 2307/412* (2013.01); *B32B 2307/414* (2013.01); *B32B 2307/75* (2013.01); *B32B 2309/02* (2013.01); *B32B 2309/12* (2013.01);

(Continued)

(58) Field of Classification Search
None
See application file for complete search history.

(56) References Cited

U.S. PATENT DOCUMENTS 5,567,488 A * 10/1996 Allen et al. .................. 428/34.1
6,357,103 B1 * 3/2002 Sikorski ......................... 29/458

(Continued)

OTHER PUBLICATIONS

Rosato, Dominick V. Rosato, Donald V.. (2003). Plastics Engineered Product Design—1.3.4.1 Glass Transition Temperatures. (pp. 26-28 cited). Elsevier. Online version available at: http://app.knovel.com/hotlink/pdf/id:kt00TY2QKK/plastics-engineered-product/glass-transition-temperatures.*

(Continued)

*Primary Examiner* — Laura C Powers
(74) *Attorney, Agent, or Firm* — Workman Nydegger (57) ABSTRACT

Implementations of the present invention relate to systems, methods, and apparatus for manufacturing aesthetically pleasing, decorative architectural resin panels having high-resolution image layers. In particular, at least one implementation includes a laminated resin panel having a decorative image layer formed from layered or cross-linked ink free from cracks, splits, or other deformation. Additional implementations relate to curved or otherwise non-planar decorative architectural resin panels having high-resolution image layers.

20 Claims, 5 Drawing Sheets

(51) Int. Cl.
*B32B 27/40* (2006.01)
*B32B 27/18* (2006.01)
*B32B 37/18* (2006.01)
*B32B 37/10* (2006.01)
*B32B 37/12* (2006.01)

(52) U.S. Cl.
CPC ....... *B32B 2451/00* (2013.01); *B32B 2607/00* (2013.01); *Y10T 156/10* (2015.01); *Y10T 428/24868* (2015.01)

(56) References Cited

U.S. PATENT DOCUMENTS

| | | | | |
|---|---|---|---|---|
| 6,875,301 | B2* | 4/2005 | Kauppi et al. | 156/245 |
| 7,504,159 | B1* | 3/2009 | Suare | B27D 1/00 427/213.31 |
| 2004/0013890 | A1* | 1/2004 | Kovalchuk et al. | 428/480 |
| 2004/0063809 | A1* | 4/2004 | Fu et al. | 523/160 |
| 2005/0171292 | A1* | 8/2005 | Zang et al. | 525/330.3 |
| 2006/0019099 | A1* | 1/2006 | Wang | B29C 45/14811 428/412 |
| 2006/0078716 | A1* | 4/2006 | Yacovone | B32B 17/10 428/210 |
| 2008/0286537 | A1* | 11/2008 | Lefaux | B41M 7/0027 428/203 |
| 2010/0221509 | A1* | 9/2010 | Suga | B29C 45/14811 428/201 |
| 2010/0310887 | A1* | 12/2010 | Kim | B32B 17/10018 428/426 |
| 2013/0324645 | A1* | 12/2013 | Enomoto | G02B 1/04 524/96 |

OTHER PUBLICATIONS

Ebnesajjad, Sina et al. (2015), Adhesives Technology Handbook (3rd Edition)—Chapter 5 Characteristics of Adhesive Materials,5. 19.2 Ethylene-Vinyl Acetate (EVA) and Polyolefin Resins (pp. 117-118 cited), Online version available at: http://app.knovel.com/hotlink/pdf/id:kt00U7YK5Q/adhesives-technology/ethylene-vinyl-acetate.*

Kreith, Frank Goswami, D. Yogi. (2004). CRC Handbook of Mechanical Engineering (2nd Edition)—12.2.2.17 Polycarbonate. (pp. 12-27 to 12-28 cited). Online version available at: http://app.knovel.com/hotlink/pdf/id:kt00CA0D11/crc-handbook-mechanical/polycarbonate.*

Chaturvedi, M.C.. (2012). Welding and Joining of Aerospace Materials—8.2.6.1 Glass Transition Temperature. (pp. 241-246 cited). Woodhead Publishing. Online version available at: http://app.knovel.com/hotlink/pdf/id:kt00BUTE61/welding-joining-aerospace/glass-transition-temperature.*

"FMS Foam Molders & Specialties" Website Accessed Oct. 14, 2016, Internet <"http://www.foammolders.com/2012/07/24/thermoforming-versus-injection-molding/"> 2 pages.

* cited by examiner

RESIN-BASED PANEL WITH ENCAPSULATED HIGH-RESOLUTION IMAGE LAYER AND METHODS OF MAKING SAME

CROSS-REFERENCE TO RELATED APPLICATIONS

This application claims priority to U.S. Provisional Application Ser. No. 61/721,326, filed 1 Nov. 2012, and entitled RESIN-BASED PANEL WITH ENCAPSULATED HIGH-RESOLUTION IMAGE LAYER AND METHODS OF MAKING SAME, the entirety of which is hereby incorporated by reference.

BACKGROUND OF THE INVENTION

1. The Field of the Invention

This invention relates to systems, methods, and apparatus for producing decorative resin panels. In particular, one or more implementations of the present invention relates to creating decorative resin panels having high-resolution image layer(s) encapsulated therein.

2. The Relevant Technology

Decorative panels are increasingly popular for use in architectural design implementations, such as in walls, doors, floors, dividers, lighting diffusers, ceiling panels and the like. Decorative panels can also be used in sculptural works. Decorative panels made of glass or polymeric resins are particularly popular in architectural design due the structural, performance, and aesthetic properties they provide. There are many different materials (and methods of manufacturing/means to manufacture these materials) that can be utilized to create a resin-based panel.

In one example, a first sheet (e.g., a glass or polymeric resin sheet) is positioned on a surface, an image layer (e.g., a digitally-printed or screen-printed film) is then positioned on the first sheet, and a second sheet (a glass or polymeric resin sheet) is positioned on top of the image layer, thereby creating a particular laminate assembly. The laminate assembly is then solidified by means of any number of panel forming processes. For example, a manufacturer might apply a liquid adhesive between the first and second sheets, or might thermoform the first and second sheets about the image layer using an appropriate amount of temperature and pressure. The resulting panel, which exhibits the aesthetic properties of the image layer, is then prepared and positioned in the appropriate architectural environment (e.g., door, window, wall, etc.).

Unfortunately, conventional products such as those described above, have various limitations. For example, conventional image layers are commonly limited to low-resolution images (e.g., 75-150 dots per square inch ("dpi")). The low-resolution images are often necessary to prevent ink cracking or image distortion of the image layer during lamination. For example, low-resolution screen printing or gravure printing with solvent-based inks is utilized to produce somewhat flexible images that can stretch or otherwise "give" to an extent when subjected to heat and pressure during lamination.

In particular, the heat and pressure applied during lamination typically causes the film upon which the ink is applied to flow to one extent or another. This flow of the image layer can cause the less flexible inks to split or crack. The stretch or flexing of the solvent-based inks, however, can prevent the image (i.e., ink) from splitting or otherwise distorting during lamination. Conventional screen printing or gravure printing, unfortunately, does not allow for high-resolution images or on-demand printing.

Image layers created using other printing techniques, such as laser or inkjet printing, can create high-resolution images and allow for on-demand printing. Unfortunately, when laser or inkjet images layers are laminated between resin sheets using heat and pressure, the images (i.e., ink) tend to split, crack, and otherwise distort. The splitting and other distortion of high-resolution image layers using conventional methods is due at least in part to layering and/or cross-linking of the ink. Cross-linked or polymerized inks are typically thermoset and tend to resist stretching or other movement. Thus, when such image layers are used in conventional lamination processes using heat and pressure, flow created in the layers of the laminate assembly often causes such less flexible ink to split, crack, or otherwise distort. In addition to the foregoing, architects often desire to use curved or otherwise non-planar panels with interlayers having images printed thereon. Thermoforming of conventional panels with printed image layers is another situation where the image layer may flow and therefore may cause the images to split and crack.

Conventional mechanisms are often therefore inefficient, if not completely ineffective, at creating decorative resin-based panels, particularly non-planar panels, with high-resolution images free of splits, cracks, or other distortions. As such, there is an increasing desire or need to combine the benefits of resin-based panels with high-resolution images in an efficient, cost-effective, and non-distorted way.

BRIEF SUMMARY OF THE INVENTION

One or more implementations of the present invention solve one or more of the foregoing or other problems in the prior art with systems, methods, and apparatus for manufacturing aesthetically pleasing, decorative architectural panels having high-resolution image layer(s) free of splits, cracks, and/or other distortion. Additionally, one or more implementations provide systems, methods, and apparatus for manufacturing curved or otherwise non-planar decorative panels having high-resolution image layer(s) free of splits, cracks, and/or other undesirable defects. In particular, one or more implementations allow for panels with image layers with cross-linked or layered inks to not exhibit splitting, cracking or distortion during and/or after lamination and/or thermoforming. One or more implementations of the present invention thereby allow the manufacturing of resin panels with high-resolution, on-demand custom images layers efficiently and effectively.

For instance, one implementation includes a laminated decorative panel having a high-resolution decorative image layer including layered or cross-linked ink that is not cracked, split, or otherwise distorted. The laminated decorative resin panel includes opposing outer substrates and a decorative image layer positioned between and laminated to each of the opposing outer substrates. The decorative image layer includes cross-linked or layered ink applied to a film. The cross-linked or layered ink is substantially devoid of visible cracks, splits, and other distortions.

At least one implementation includes a method of manufacturing a decorative resin panel having a high-resolution decorative image layer including layered or cross-linked ink, such that the layered or cross-linked ink is not cracked, split, or otherwise distorted during manufacturing. In some implementations, the method includes forming a panel layup assembly including: opposing outer substrates; a decorative image layer positioned between the opposing outer substrates, the decorative image layer comprising a film having a glass transition temperature and cross-linked or layered ink applied to the film; and one or more tie layers positioned between the decorative image layer and at least one of the opposing outer substrates. Certain implementations may also include laminating the panel layup assembly at an activation temperature and pressure for the one or more tie layers such that the one or more tie layers adhere the decorative image layer to at least one of the opposing outer substrates and/or cooling the laminated panel layup assembly to form a laminated panel. In some implementations, the layered or cross-linked ink does not become cracked, split, or otherwise distorted during manufacturing.

At least one other implementation includes a method of manufacturing a decorative resin panel having a high-resolution decorative image layer including layered or cross-linked ink, such that the layered or cross-linked ink is not cracked, split, or otherwise distorted during manufacturing. In some implementations, the method includes forming a panel layup assembly including: opposing outer substrates; and a decorative image layer positioned between the opposing outer substrates, the decorative image layer including a film having a glass transition temperature and cross-linked or layered ink applied to the film, wherein: (1) the cross-linked or layered ink is discontinuously applied to at least one side of the film such that the film includes one or more areas free of cross-linked or layered ink; and (2) the one or more areas free of cross-linked or layered ink include one or more bonding sites that allow the film to directly bond to at least one of the opposing outer substrates. Certain implementations may also include laminating the panel layup assembly at or above the glass transition temperature of the film such that the film can bond to the decorative image layer to at least one of the opposing outer substrates and/or cooling the laminated panel layup assembly to form a laminated panel. In some implementations, the layered or cross-linked ink is not cracked, split, or otherwise distorted during manufacturing.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows, and in part will be obvious from the description, or may be learned by the practice of the invention. The features and advantages may be realized and obtained by means of the instruments and combinations particularly pointed out in the appended claims. These and other features will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific implementations and/or embodiments thereof which are illustrated in the appended drawings. It should be noted that the figures are not necessarily drawn to scale, and that elements of similar structure or function are generally represented by like reference numerals for illustrative purposes throughout the figures. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Implementations of the present invention relate to systems, methods, and apparatus for manufacturing aesthetically pleasing, decorative architectural panels having high-resolution image layer(s) free of splits, cracks, and/or other distortion. Additionally, one or more implementations provide systems, methods, and apparatus for manufacturing curved or otherwise non-planar decorative panels having high-resolution image layer(s) free of splits, cracks, and/or other undesirable defects. In particular, one or more implementations allow for panels with image layers with cross-linked or layered inks to not exhibit splitting, cracking or distortion during and/or after lamination and/or thermoforming. One or more implementations of the present invention thereby allow the manufacturing of resin panels with high-resolution, on-demand custom images layers efficiently and effectively.

For instance, one implementation includes a laminated decorative panel having a high-resolution decorative image layer including layered or cross-linked ink that is not cracked, split, or otherwise distorted. The laminated decorative resin panel includes opposing outer substrates and a decorative image layer positioned between and laminated to each of the opposing outer substrates. The decorative image layer includes cross-linked or layered ink applied to a film. The cross-linked or layered ink is substantially devoid of visible cracks, splits, and other distortions.

One or more implementations include decorative resin-based panels having a cross-linked or layered ink decorative image layer. More specifically, such resin-based panels can include a decorative image layer (e.g., a film with a printed image or color) bonded or fused to outer resin sheets, illustratively by one or more tie layers positioned about the film. Thus, certain implementations may include a resin-based panel having a decorative image or image layer embedded therein. A manufacturer can select the film of the decorative image layer based on the processing parameters of at least the outer resin sheets in conjunction with the tie layer(s) to eliminate or minimize the flow of the decorative image layer caused by lamination heat and pressure. By selecting the film of the decorative image layer based on the processing parameters of the resin sheets and tie layer(s), the manufacturer can reduce or prevent splitting, cracking, stretching, and/or other distortion of the decorative image layer during lamination.

As alluded to earlier, one or more implementations can include curved or otherwise non-planar decorative panels having high-resolution image layer(s) free of splits, cracks, and/or other undesirable defects. To allow for thermoforming, the manufacturer can select the film of the decorative image layer to allow for thermoforming of the laminated panel assembly at the processing temperatures and pressures required for thermoforming the outer resin sheets. Additionally, the manufacturer can select the tie layer(s) of the decorative image layer based on the processing parameters needed to thermoform the outer resin sheets. In particular, the manufacturer can select a tie layer that will not substantially flow at the processing temperature(s) and pressure(s) required to thermoform the layers of the laminate panel. Thus, by properly selecting the film and/or ink of the decorative image layer, the tie layers, and/or the outer sheets or substrates, the manufacturer can reduce or prevent splitting, cracking, stretching, and/or other distortion of the decorative image layer during panel forming and post-forming processes (e.g. lamination, thermoforming, heat pressing, molding, cutting, trimming, shaving, or otherwise altering the shape, size, or dimensions or the panel and/or components thereof).

In still further implementations, the decorative resin-based panel with a high-resolution image layer free from splits or other defects does not include a tie layer. In such implementations, the cross-linked or layered ink can be intermittently or otherwise discontinuously applied to a film on one or both sides such that the cross-linked or layered ink does not entirely cover one or more surfaces of the film. Thus, the intermittent application of the cross-linked or layered ink can leave exposed regions of the film or film surface. The exposed regions of the film effectively become bonding sites that can allow a manufacturer to laminate the film layer directly to outer resin sheets without tie layers and without causing the cross-linked or layered ink to split, crack, or otherwise distort. In addition to the foregoing, such decorative resin-based panels also can allow for post-lamination thermoforming, while maintaining the integrity of the ink-based image layer (e.g., remain free of splits, cracks, and/or other defects or distortions).

As used herein, "lamination," "laminating," and similar terms refer to any process, procedure, or other technique of manufacturing a material including or otherwise comprising a plurality of layers such that the composite material achieves improved strength, stability, appearance, or other properties from or over at least one of the individual components or differing materials. In some instances, lamination may involve thermoforming, permanently or temporarily binding, bonding, fusing, connecting or otherwise manufacturing the composite material by heat, pressure, welding, and/or adhesive(s), and/or forming the composite material in a planar or non-planar configuration.

As used herein, "thermoforming" and similar terms refer to any manufacturing process by which a material is heated to a malleable or pliable form or processing temperature and formed to a specific shape (often in a mold or other shaping apparatus), whether planar or non-planar. In some instances, the material may also be trimmed, cut, stretched or otherwise altered and/or cooled in a finished shape. When appropriate, thermoforming may also refer specifically to a process by which a laminated or otherwise formed panel is subsequently heated and formed to a specific shape, whether planar or non-planar.

Additionally, as mentioned previously, in addition to unique and desirable aesthetics (vibrant colors and translucency changes), implementations of the present invention can also provide excellent structural properties. For example, implementations of the present invention can allow for high-resolution image layer(s) free of splits, cracks, or other distortion that also are resistant to delamination. Designers can use such decorative resin-based panels in lighting applications, such as light boxes, or as window coverings. Furthermore, the decorative printed image layers of the panels can provide varying degrees of transparency/translucency, and thus, varying degrees of privacy. In at least one implementation, one or more layers of the panel, including substrate(s), tie layer(s), or other layer(s), may have an opaque character, quality, or appearance. Thus, designers can use decorative resin-based panels of the present invention as partitions, doors, or dividers where varying degrees of privacy are desired.

Accordingly, and as will be appreciated more fully from the following description and claims, a decorative resin-based panel in accordance with an implementation of the present invention can have aesthetic and functional versatility, and function in a wide variety of installations. In particular, designers can use the decorative resin-based panels described herein in any number of ceiling, floor, wall, and/or other applications, including any residential, commercial, industrial, or other environments. For example, decorative resin-based panels described herein can serve a primarily functional or structural use as a building component. In addition, the decorative resin-based panels described herein can function primarily for aesthetic/decorative use, such as to apply a particular image, design, look, and/or texture to a wall, column, or lighting element/arrangement in an interior or exterior space.

Figure 1A:
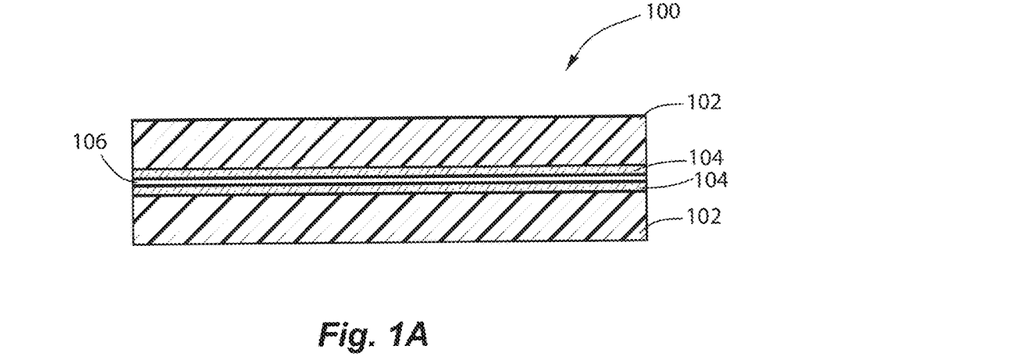
FIG. 1A illustrates a cross-sectional view of a panel layup or laminate assembly for creating a decorative resin-based panel with a high-resolution image layer free from splits or other defects in accordance with an implementation of the present invention.
Figure 1B:
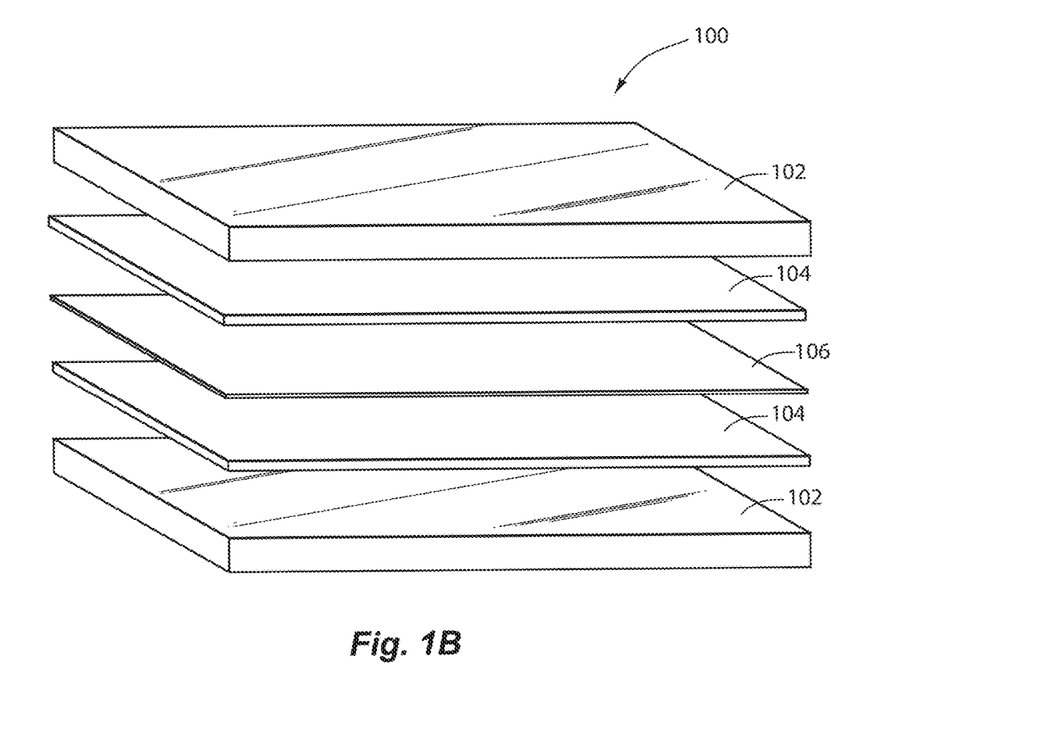
FIG. 1B illustrates an exploded, perspective view of the laminate assembly shown in FIG. 1A.

Referring now to the Figures, FIGS. 1A and 1B respectively illustrate cross-sectional and exploded perspective views of the layers of a panel layup or laminate assembly 100 in accordance with an implementation of the present invention. As shown, the panel layup assembly 100 can include outer sheets or substrates 102. The substrates 102 can form opposite outer (or top and bottom) layers of the panel layup assembly 100. The substrates can comprise glass, resin, or other material configured for or compatible with panel formation. As used herein, the terms "resin substrate" and "resin sheet" refer to substrates or sheets including or otherwise comprising one or more layers formed from any one of the following thermoplastic polymers (or alloys thereof). Specifically, such materials can include, but are not limited to, copolyesters, polyethylene terephthalate (PET), polyethylene terephthalate with glycol-modification (PETG), acrylonitrile butadiene-styrene (ABS), polyvinyl chloride (PVC), polyvinyl butyral (PVB), ethylene vinyl acetate (EVA), polycarbonate (PC), styrene, polymethyl methacrylate (PMMA), polyolefins (low and high density polyethylene, polypropylene), thermoplastic polyurethane (TPU), cellulose-based polymers (cellulose acetate, cellulose butyrate or cellulose propionate), poly lactic acid (PLA), or the like. Furthermore, the resin substrates, sheets, or blocks can include other thermoplastic polymers or thermoplastic polymer blends, or combinations and mixtures thereof. In addition, any given substrate or sheet can include any number of the disclosed or other layers or coatings.

For example, the panel layup assembly or laminate assembly 100 shown in FIG. 1 includes two resin substrates 102. One will appreciate, however, that the panel layup assembly 100 can alternatively include multiple glass- or resin-based substrates of the same or different materials. The size (i.e., surface area and/or dimensions) of the resin substrates 102 can also be any appropriate size for the resulting size of the final decorative architectural resin panel. In at least one implementation, for example, the resin substrates 102 can be about four feet by about eight feet (4'×8'), about four feet by about ten feet (4'×10'), about six feet by about fifteen feet (6'×15'), or taller/wider. Or alternatively, the resin substrates 102 can be about six inches by about six inches (6"×6") or shorter/narrower. Intermediate sizes of greater than about six inches by about six inches (6"×6") and less than about four feet by about eight feet (4'×8') are also contemplated herein. Thus, the size of the resin substrates 102 can vary depending upon the desired dimensions of a final decorative architectural resin panel. Furthermore, in certain implementations, a first resin substrate may have a first size and a second resin substrate may have a different, second size.

Similarly, the thicknesses or gauge of the resin substrates 102 can vary in thickness or size to include a range from relatively thin gauge films to thicker gauge sheets (e.g., about one-thirty-second inch (1/32") or less to about 5 inches (5") or more). For example, in one or more implementations, the thicknesses of the resin substrates 102 can be anywhere from about one-sixteenth inch (1/16") to about two inches (2") inches. The thicknesses of the resin substrates 102 can be based at least partially on the desired end-use of the resulting panel. Furthermore, in certain implementations, a first resin substrate may have a first thickness or gauge and a second resin substrate may have a different, second thickness or gauge.

In one or more implementations, at least one of the resin substrates 102 preferably includes a substantially transparent or translucent resin material, thereby providing a view of a decorative image layer 106 positioned between the first and second resin substrates 102. The decorative image layer 106 can include a resin-based film layer formed from one or more of the aforementioned thermoplastic polymers (or polymer alloys thereof). Furthermore, the decorative image layer 106 can include one or more images or colors formed from cross-linked or layered ink. For example, the entire decorative image layer can include a single color (i.e., a colored film) or can include one or more images including a plurality of colors.

As used herein, the term "layered ink" refers to an image or color formed from at least two layers of overlapping ink. In some instances such layered ink can include a first layer of white ink (e.g., to help with diffusion), and one or more additional overlaid layers of ink (e.g., forming an image on the white layer or ink). Alternatively, a layered ink can include multiple layers of ink used to form vivid colors of varying transparency in the decorative image layer 106. Such layered ink layers can, in some implementations, include cross-linked inks.

In one or more implementations, the cross-linked or layered ink is or has been applied to the film by an inkjet, laser, or other printer or printing apparatus. One will appreciate that such printing techniques can allow for essentially any digital image to be printed on the film. Thus, implementations of the present invention allow for on-demand customized images.

Furthermore, in some implementations, the ink can include a UV curable ink or other ink suitable for use an inkjet or laser printer. As an example, in one or more implementations the ink includes 30-50% by weight of 2-Phenoxyethyl acrylate; 15-30% by weight of Dipropylene Glycol Diacrylate; 15-30% by weight of Isobornyl acrylate ester; 15-30% by weight of N-vinylcaprolactam; and 5-10% by weight of 2,4,6-Trimethylbenzoyl diphenyl Phosphine Oxide. One will appreciate in light of the disclosure herein that the foregoing ink is only one kind or illustrative example of an ink that may be used, and the present invention is not limited to the foregoing ink only.

FIGS. 1A and 1B further illustrate that the panel layup assembly 100 may include one or more tie or adhesive layers 104. The tie layers 104 may help to adhere, bond, or fuse the decorative image layer 106 to the outer substrates 102. The tie layers 104 can be any appropriate adhesive layer such as a solid film-format ethylene vinyl acetate or "EVA"; ethylene acrylates, such as ethyl methacrylate or "EMA"; polyvinyl butyral or "PVB"; or any thermoplastic polyolefin (TPO) or thermoplastic polyurethane (TPU) of aliphatic or aromatic construct capable of adhering opposing resin sheets together with applied heat.

One advantage provided by a tie layer 104, such as those aforementioned, is that bonding can be effectuated more easily in some cases between the resin and decorative image layer at lower temperatures and pressures than typically used without tie layers. For instance, without tie layer(s) an illustrative temperature of up to 400° F. or more and/or a pressure of up to 120 psi or more may be required and/or chosen to effectuate bonding and/or lamination, while an illustrative temperature of up to 200° F. or more and a pressure of up to 95 psi or more may be required and/or chosen when tie layer(s) are included in the panel layup assembly 100. Furthermore, a tie layer 104, such as TPU, can aid in removing contaminants and/or air bubbles efficiently compared with using liquid-based adhesives. Nevertheless, one will appreciate that liquid or other adhesives may also be appropriate for tie layer in some cases. Furthermore, it is not necessary in all cases to apply a tie layer as explained in greater detail below.

In any event, often the tie layer 104 will "activate" to form a bond between the decorative image layer 106 and the outer substrates 102 upon the application of certain amounts of heat and pressure. More specifically, the tie layer(s) 104 may act to bond the laminate assembly together upon the application of an activation temperature and an activation pressure. One will appreciate that the activation temperature and pressure for each tie layer 104 is not limited to a single temperature or pressure, but rather a range of temperatures and pressures can activate the tie layers 104. Furthermore, the activation temperatures and pressures can be co-dependent. Thus, a lower activation temperature may require a higher activation pressure and vice versa.

As alluded to above, the material of the film for the decorative image layer 106 can include a material selected to prevent the cross-linked or layered ink from splitting, cracking, stretching, or otherwise deforming during lamination of the panel layup assembly 100. In particular, the material of or for the film of the decorative image layer 106 can comprise any material selected to eliminate or reduce flow during lamination of the panel layup assembly 100. For example, the film of the decorative image layer can have a "glass transition temperature" and/or a "heat distortion temperature" that will prevent the film from flowing enough to visibly damage the ink of the decorative image layer during the lamination process.

For instance, the film of the decorative image layer 106 can be selected such that the film has a glass transition temperature that is: (1) greater than or equal to the activation temperature of the tie layers 104; or (2) the activation temperature (Ta) of the tie layers 104 minus the glass transition temperature (Tg) of the film is less than 25% of the glass transition temperature of the film (i.e., 0.25>(Ta−Tg)/Tg). As a non-limiting example, when using tie layers 104 having an activation temperature of 235° F., a film layer having a glass transition temperature that is greater than about 188° F. may prevent cracking of certain cross-linked or layered ink (or other image-generating substance) applied to such a film.

A manufacturer can additionally or alternatively select the film (or material thereof) of the decorative image layer 106 based on the film's (or material's) heat distortion temperature. For example, the film of the decorative image layer 106 can be selected or configured such that at (or about) the activation pressure of the tie layer(s) 104: (1) the film has a heat distortion temperature that is greater than or equal to the activation temperature of the tie layers 104; or (2) the activation temperature (Ta) of the tie layers 104 minus the heat distortion temperature of the film at the activation pressure of the tie layers 104 (Td) is less than about 20% of the heat distortion temperature of the film at the activation pressure of the tie layers 104 (i.e., 0.20>(Ta−Td)/Td). As a non-limiting example, when using tie layers 104 having an activation temperature of 235° F. at an activation pressure of 95 psi, a film layer having a heat distortion temperature at 95 psi that is greater than about 180° F. may prevent cracking of some types of cross-linked or layered ink applied to such a film (or the surface thereof).

The foregoing describes selecting the film of the decorative image layer 106 based on the tie layers 104. One will appreciate in light of the disclosure herein that, a manufacturer can alternatively select the tie layers 104 based on film of the decorative image layer 106 (or material thereof).

One will appreciate that panel layup assembly 100 can also include other layers not necessarily shown in FIGS. 1A and 1B, such as additional resin layers, adhesive layers, texture paper, decorative objects or elements, and/or additional film layer as appropriate. Such additional layers can be provided as part of the panel layup assembly 100, or can be provided to the resulting laminate panel after the lamination, thermoforming, or other processes described herein. One will also appreciate that panel layup assembly 100 may include and/or otherwise comprise fewer layers than illustrated in FIGS. 1A and 1B, such as the panel layup assembly 100a illustrated in FIG. 4 and described in detail below, without departing from the scope of this disclosure.

Figure 2:
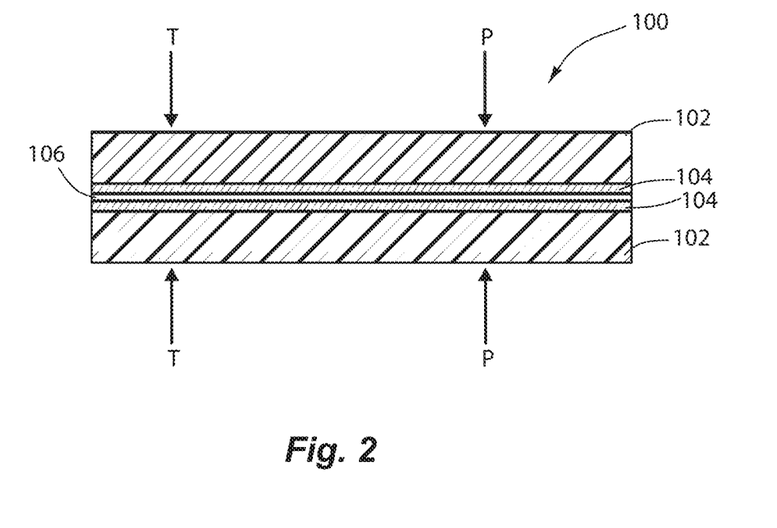
FIG. 2 illustrates an overview schematic diagram for producing a decorative resin-based panel with a high-resolution image layer free from splits or other defects through a lamination process in accordance with the principles of the present invention.

In any event, upon creation of the panel layup assembly 100, the manufacturer may then apply appropriate temperature T and pressure P as shown by or illustrated in FIG. 2, to laminate the panel layup assembly together. One will appreciate that temperature T may be applied uniformly or non-uniformly to the panel layup assembly 100, and need not only be applied from above and below panel layup assembly 100. Likewise, pressure P may be applied uniformly or non-uniformly, and need not only be applied from above and below panel layup assembly 100.

In at least one implementation, the manufacturer applies enough heat and pressure to cause the one or more tie layers 104 to soften or flow. In particular, the temperature T and pressure P causes a first side or surface of each tie layer 104 to fuse or bond to the decorative image layer 106. Similarly, the temperature T and pressure P cause a second opposing side or surface of each tie layer to fuse or bond to an outer substrate 102. In other words, the manufacturer can subject the panel layup assembly 100 to at least the activation pressure and/or activation temperature of the one or more tie layers 104 such that the respective outer substrate(s) become laminated or bonded to at least the respective tie layer(s) 104. The temperature T and pressure P can be sufficiently low to avoid causing enough flow of the film to crack or otherwise deform the ink of the decorative image layer 106, while also being sufficient to create a strong bond to prevent delamination.

In any event, the manufacturer can hold the panel layup assembly 100 at the activation temperature and/or pressure until the tie layer(s) 104 fuse or bond to the substrates 102 and/or the decorative image layer 106, such as for about 0.1 minutes or less to about 4 hours or more. One will appreciate that a manufacturer can apply the processing temperature(s) T and pressure(s) P to the panel layup assembly 100 in any number of different apparatus. For example, the manufacturer can place the panel layup assembly 100 within a thermosetting press or other device (not shown). In general, the thermosetting press can include upper and lower platens configured to provide direct heat and pressure to both opposing sides of the given panel layup assembly 100. Heated mechanical press lamination methods include, but are not limited to, hot steam, electric heat, hot oil heated and other methods.

In addition to the foregoing, implementations of the present invention further include using an autoclave, oven, or other device (not shown) to apply the activation temperature(s) T and pressure(s) P. For example, the manufacturer can place the panel layup assembly 100 into a vacuum bag (not shown). The manufacturer can then seal the edges of the vacuum bag, and remove air from the vacuum bag. The manufacturer can then place the vacuum bag within the autoclave, which applies equal heat and pressure in all directions on the panel layup assembly 100. In general, an autoclave can heat the panel layup assembly 100 (e.g., via a convection process, rather than via conduction as with a mechanical press) with a controlled temperature profile.

One will appreciate that the autoclaving process can provide a number of additional benefits for creating an appropriate, aesthetically pleasing, resin panel. For example, autoclaving is typically not constrained to one size/format (i.e., an autoclave can process a 2'×4' piece at the same time as an 8'×10' piece). In addition, in the autoclaving process, pressure can be continuous throughout heating and cooling cycles. This continuous pressure can keep the panel layup assembly 100 flat throughout the heating and cooling cycles, which can eliminate undesirable bowing. Further along these lines, autoclaving is a convective heating process that allows for more controlled heating and cooling at each direction about the laminate assembly, and thus allows for equal temperatures at the same depth throughout each corresponding substrate's thickness. Again, since the temperature and pressure, is uniformly distributed throughout each substrate, the autoclave can process multiple different panel layup assembly 100 without any undesirable warping/bowing, etc.

In addition to an autoclave process, yet another implementation for heating and pressurizing a panel layup assembly 100 can include use of a vacuum press or other device (not shown). In particular and as previously mentioned with respect to the autoclave process, a manufacturer can prepare a vacuum bag with a panel layup assembly 100 therein. The manufacturer can then position the vacuum bag into a vacuum press, and apply the appropriate processing temperatures and pressures. In another implementation, a manufacturer can place a panel layup assembly 100 (without a vacuum bag) in a vacuum press chamber, where air is evacuated prior to application of mechanical pressure.

Figure 5:
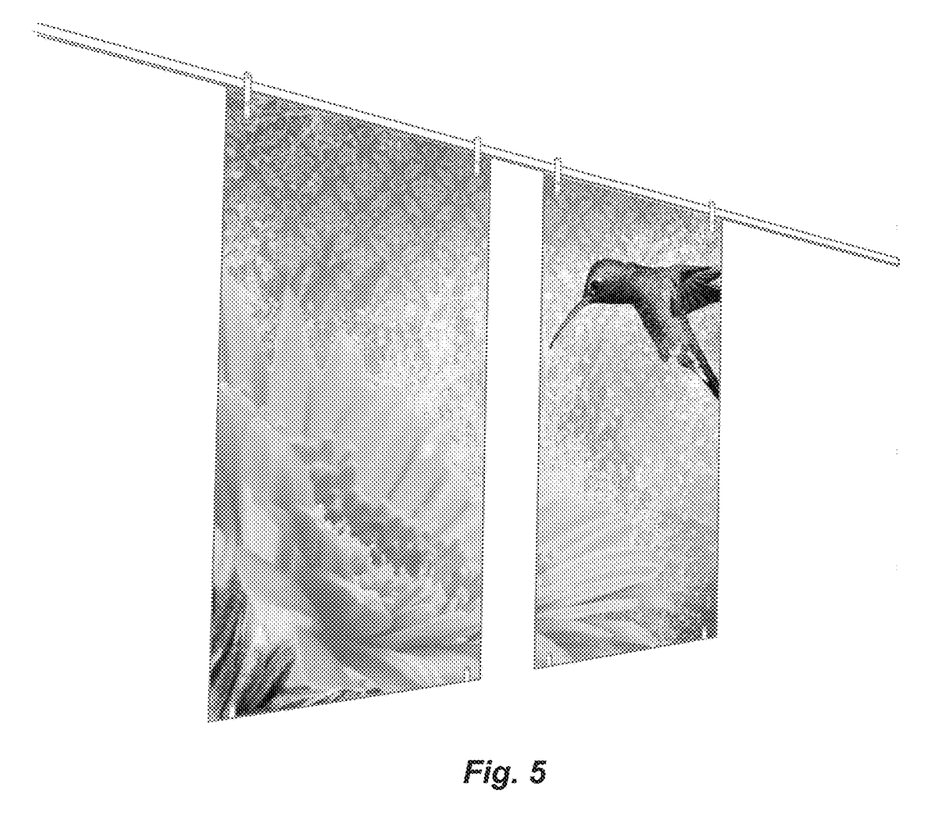
FIG. 5 illustrates a pair of decorative resin-based panels with high-resolution image layers free from splits or other defects displayed as a wall treatment in accordance with an implementation of the present invention.

In any event, following the application of heat and pressure, the manufacturer can allow the laminated/fused panel layup assembly 100 (or panel) to cool below the activation temperature of the tie layers 104 while holding the panel assembly rigid. For instance, the manufacturer can reduce the temperature of the panel layup assembly 100 to between about 50° F. or less and about 120° F. or more, and hold the panel assembly at a pressure of between about 1 psi or less and about 120 psi or more. Once the panel layup assembly 100 cools below the softening temperature, the manufacturer can remove the decorative resin panel from the pressing mechanism or laminating device. For example, FIG. 5 illustrates a pair of decorative architectural panels having high-resolution image layer(s) free of splits, cracks, and/or other distortion suspended in a room as wall treatments.

In addition to forming a decorative architectural panel having high-resolution image layer(s) free of defects, one or more implementations also allows for post-forming of such panels into non-planar configurations without visibly damaging the ink of the image layer (or a configuration thereof). In particular, a manufacturer can further select the layers of the panel layup assembly 100 so as to allow for post formation without damage to the ink image or color. For example, to thermoform a decorative architectural panel having a high-resolution image layer, such as those shown in FIG. 5, the manufacturer can heat the panel to a processing temperature sufficient to make the panel malleable. At this point, the manufacturer can mold or otherwise shape the panel.

As alluded to above, the materials of the panel (and thus the panel layup assembly) may be selected to prevent the cross-linked or layered ink from splitting, cracking, stretching, or otherwise deforming during lamination and/or post formation (e.g., thermoforming). For example, in addition to the selection factors mentioned above, the manufacturer can select a film for the decorative image layer that will allow for thermoforming at the processing temperatures of the outer substrates 102.

A manufacturer may select a film having a glass transition temperature as near as possible to the glass transition temperature of the outer substrates 102, while still meeting the selection criteria outlined above for lamination. In particular, the manufacturer can select a film having a glass transition temperature approximately equal to or above the glass transition temperature of the outer substrate 102. Alternatively, the manufacturer can select a film such that a temperature difference between the processing temperature (Tp) and the glass transition temperature (Tg) of the film is less than about 20% of the glass transition temperature of the film (i.e., $0.30>|(Tp-Tg)|/Tg$). As a non-limiting example, when using outer substrates 102 having a processing temperature of about 210° F., a film layer having a glass transition temperature greater than about 162° F. may prevent cracking of cross-linked or layered ink during thermoforming. In addition to the foregoing, the manufacturer can ensure that the processing temperature for thermoforming the completed laminate assembly is not hot enough to substantially degrade or boil at least the one or more tie layers.

Figure 3:
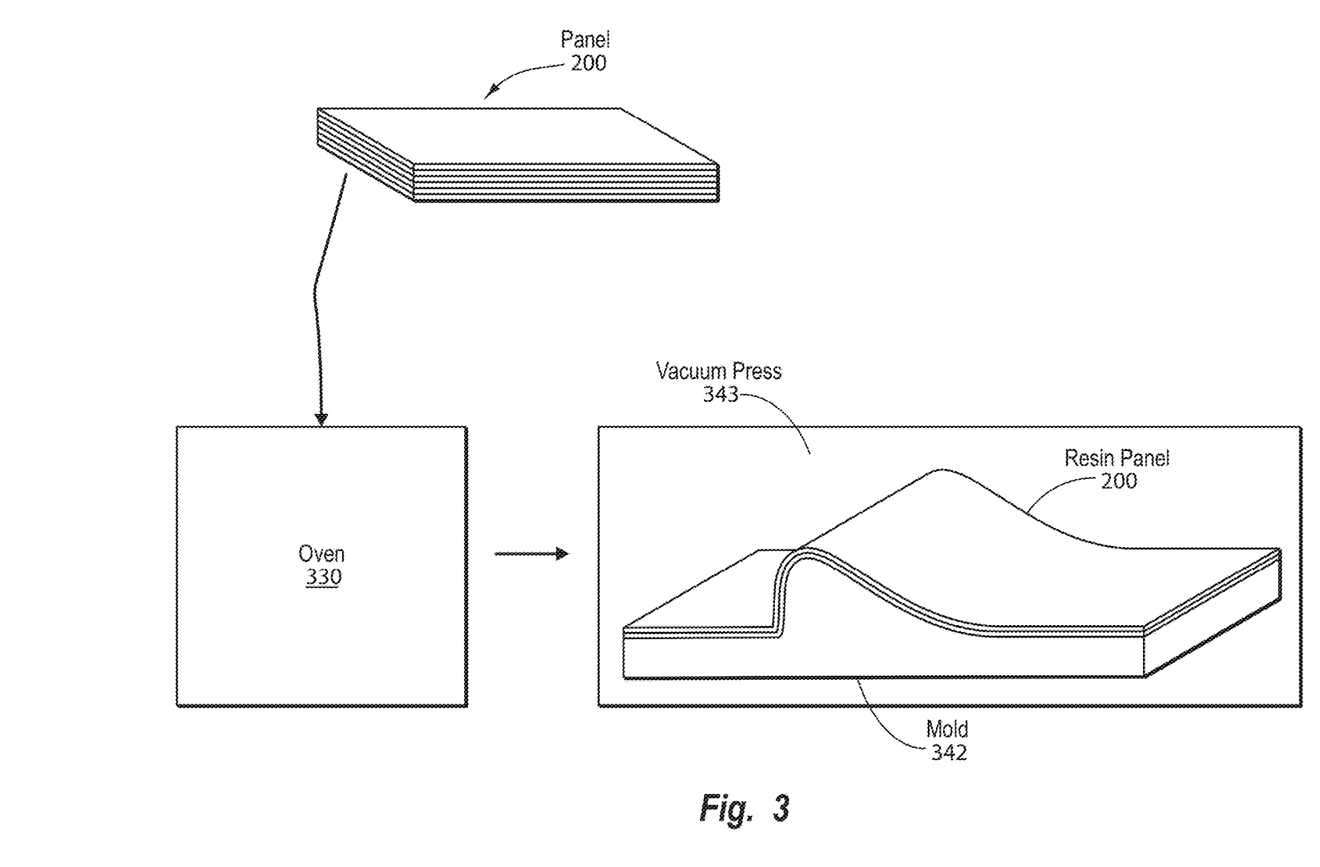
FIG. 3 illustrates an overview schematic diagram for thermoforming a decorative resin-based panel with a high-resolution image layer free from splits or other defects in accordance with the principles and/or certain implementations of the present invention.

A method for thermoforming a decorative architectural panel having a high-resolution image layer is described in relation to FIG. 3. For example, FIG. 3 illustrates an overview schematic diagram for thermoforming a decorative resin-based panel incorporating a high-resolution image layer into a planar or non-planar configuration in accordance at least one implementation of the present invention. As shown, a manufacturer places a panel layup assembly or the panel 200 (or multiple panels) formed therefrom into an oven 330. Oven 330 can be any conventional thermoforming oven, autoclave, or other device with the ability to raise the temperature of the panel 200 to a sufficient level to allow for thermoforming of the panel. For example, in at least one implementation, the oven is raised to a temperature of about between about 200° F. and about 400° F. without necessarily raising the internal pressure significantly.

Although some pressure may naturally increase inside oven 330 with the rise in temperature, no additional pressure need necessarily be applied. In any event, the oven 330 can heat the panel 200 until it is pliable. The manufacturer can then position the panel 200 about a mold, such as a mold or other shaping apparatus 342. That is, in certain implementations, the manufacturer can simply remove the heated, pliable resin or other panel 200 from the oven and rest it on top of a shaping apparatus 342. As a result, the panel 200 can conform to the contours of the shaping apparatus 342, due at least in part to the natural weight of the panel 200 component materials, as well as the pliability imparted by the oven 330 heat.

Of course, there can be any number of ways in which the manufacturer may desire to impart a specific shape to the pliable based panel 200. For example the manufacturer can press the pliable based panel 200 upward against a mold, place the based panel 200 between male and female mold components, and/or the manufacturer may simply bend the pliable based panel 200 into any one or more shapes. In any event, where curvature is desired, and the pliable based panel 200 has been subjected to shape formations, FIG. 3 shows that the pliable based panel 200 may be placed in a vacuum press 343. Vacuum press 343 may remove pressure from the interior space, helping to maintain the integrity of the pliable based panel 200, while cooling may further solidify the pliable based panel 200. In any event, upon proper selection of the various materials, the manufacturer can produce a non-planar decorative architectural panel having a high-resolution image layer in which the ink of the image layer is not visibly cracked, split, stretched, or otherwise deformed.

Figure 4:
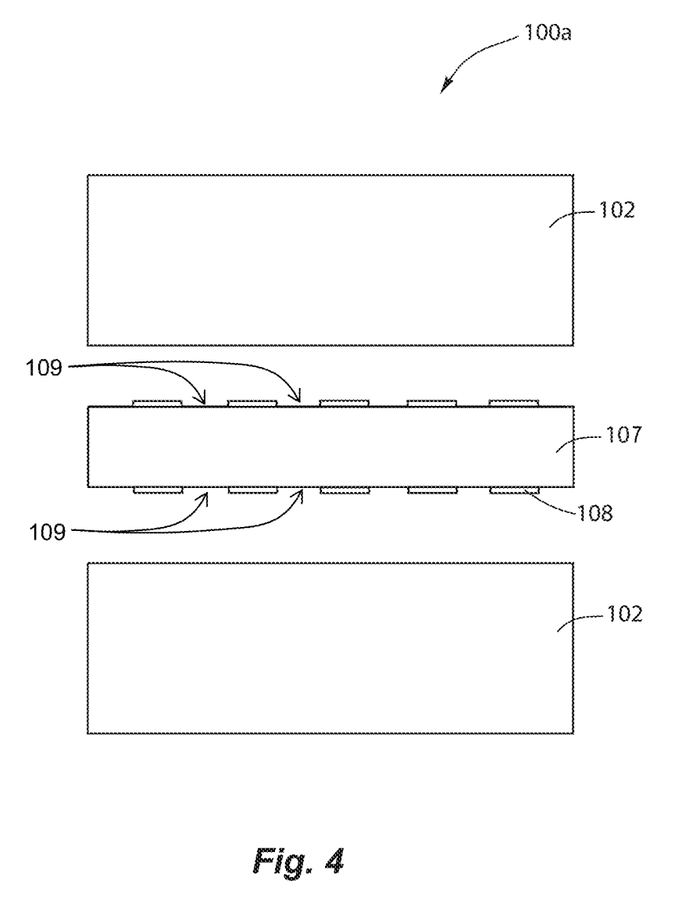
FIG. 4 illustrates an end view of a laminate assembly for creating a decorative resin-based panel with a high-resolution image layer free from splits or other defects in accordance with another implementation of the present invention.

One will appreciate that the processing temperature(s) needed to thermoform a decorative architectural panel (e.g. into a non-planar configuration) may prevent the use of many types of tie layers. For example, when the decorative architectural panel includes polycarbonate outer substrates, TPU, EVA, and other tie layers may not be able to withstand the thermoforming processing temperatures. FIG. 4 illustrates another implementation of a panel layup assembly 100a that may allow for the post-formation of decorative architectural panels having a high-resolution image layer with higher temperature resin substrates without visibly cracking, splitting, stretching, or otherwise deforming the ink of the decorative image layer.

In particular, as shown by FIG. 4, the panel layup assembly 100a can include a film 107 having cross-linked or layered ink 108 applied thereto. The panel layup assembly 100a can further include outer resin substrates 102. As shown, the film 107 can include intermittent areas 109 that are free of ink. These ink free areas 109 can serve as or otherwise comprise bonding sites that allow the film 107 to directly bond or fuse to the outer resin substrates 102 during a lamination or thermoforming process. These bonding sites may allow the film 107 to flow during lamination without cracking or otherwise visibly damaging the ink 108. Furthermore, the bonding sites allow for post formation or post-lamination formation of the panel (e.g., into a non-planar configuration) without cracking or otherwise visibly damaging the ink 108.

EXAMPLES

The following examples are presented to illustrate the invention and should not be construed to limit the scope of the invention.

Example 1

Production of ½" Nominally Thick Panel Encapsulating a High Resolution Image Layer Formed with Cross-linked Ink The materials for the panel layup assembly were assembled from top to bottom as follows: a first ¼" PETG resin substrate, a first TPU tie layer, a TRITAN (commercially available from EASTMAN CHEMICAL COMPANY) film layer with UVJET ACUITY KI SERIES ink (commercially available from Fujifilm) applied to the film layer with an ink jet printer, a second TPU tie layer, and a second ¼" PETG resin substrate.

After the assembly was completed, the assembly was inserted into a hot press heated to 235° F., the press was closed and the pressure was increased to 95 psi. Once the desired temperature was reached, the pressure was released, the press was opened, and the decorative laminate structure was removed from the press. The resulting product exhibited excellent lamination strength, while also having no visible splitting, cracking, stretching, or other distortion of the image layer.

It should be noted that the activation temperature (Ta) of the TPU tie layers used was about 235° F., the activation pressure (Pa) was about 95 psi, and the glass transition temperature of the printed film was about 229° F. Furthermore, the heat distortion temperature of the film at the 95 psi (i.e., at the activation pressure) was about 223° F. Thus, the activation temperature (Ta) of the tie layers minus the glass transition temperature (Tg) of the film was less than about 25% of the glass transition temperature of the film (i.e., $(235-229)/229<0.25$). Additionally, the activation temperature (Ta) of the tie layers minus the heat distortion temperature of the film at the activation pressure of the tie layers (Td) was less than about 20% of the heat distortion temperature of the film at the activation pressure of the tie layers (i.e., $(235-223)/223<0.20$).

Example 2

Production of ½" Nominally Thick Non-Planar Panel Encapsulating a High Resolution Image Layer Formed with Cross-Linked Ink In the second example, the panel formed in the first example was heated to a temperature of about 230° F. Upon heating, the panel was placed against a mold in a vacuum apparatus. The panel eventually took the shape of the mold. The panel was then cooled. Upon cooling it was noted that the non-planar panel exhibited excellent lamination strength, while also having no visible splitting, cracking, stretching, or other distortion of the image layer.

It should be noted that the processing temperature (Tp) of the PETG substrates was about 230° F., and the glass transition temperature of the film was about 229° F. Thus, the temperature difference between the processing temperature and the glass transition temperature of the film was less than about 20% of the glass transition temperature of the film (i.e., $(230-229)/229<0.20$).

As discussed herein, resin panels according to certain implementations of the present invention can preserve the integrity of a decorative image layer that could otherwise be ruined or disfigured using conventional laminating and/or thermoforming processes. In particular, manufacturing methods and apparatus according to certain implementations described herein allow for the incorporation of cross-linked or layered ink, which have highly-desirable aesthetic properties, but at the same time have heretofore been impractical or impossible to incorporate into translucent and/or transparent resin panels without damaging the image layer formed by the ink during lamination, thermoforming, and/or other forms of processing.

It is noted that products, processes, devices, systems, and methods according to certain embodiments of the present invention may include, incorporate, or otherwise comprise properties, features, components, members, and/or elements described in other embodiments, including systems, methods, products, devices, and/or embodiments of the same disclosed herein. Thus, reference to a specific feature in relation to one embodiment should not be construed as being limited to applications only within said embodiment.

While various aspects and embodiments have been disclosed herein, other aspects and embodiments are contemplated. The various aspects and embodiments disclosed herein are for purposes of illustration and are not intended to be limiting. Additionally, the words "including," "having," "involving" and variants thereof (e.g., "includes," "has," and "involves") as used herein, including the claims, shall be open ended and have the same meaning as the word "comprising" and variants thereof (e.g., "comprise" and "comprises").

The terms "approximately," "about," and "substantially" as used herein represent an amount close to the stated amount that still performs a desired function or achieves a desired result. For example, the terms "approximately," "about," and "substantially" may refer to an amount that is within less than 10% of, within less than 5% of, within less than 1% of, within less than 0.1% of, and within less than 0.01% of a stated amount.

The present invention may be embodied and/or implemented in other specific forms without departing from its spirit or essential characteristics. The described embodiments and/or implementations are to be considered in all respects only as illustrative and not restrictive. The scope of the invention is, therefore, indicated by the appended claims rather than by the foregoing description. While certain embodiments, implementations, and details have been included herein and in the attached invention disclosure for purposes of illustrating the invention, it will be apparent to those skilled in the art that various changes in the methods and apparatus disclosed herein may be made without departing from the scope of the invention, which is defined in the appended claims. All changes that come within the meaning and range of equivalency of the claims are to be embraced within their scope.

We claim:
1. A thermoformed laminated decorative panel having a high-resolution decorative image layer including layered or cross-linked ink that is not cracked, split, or otherwise distorted, the laminated decorative resin panel comprising:
opposing outer substrates comprising resin-based substrates; and
a decorative image layer positioned between and laminated to each of the opposing outer substrates, the decorative image layer comprising a thermoplastic film comprising cross-linked or layered ink printed thereon; and
one or more tie layers positioned between the decorative image layer and at least one of the opposing outer substrates;
wherein the decorative image layer is laminated to each of the opposing outer substrates via a thermoforming process and the cross-linked or layered ink is substantially devoid of visible cracks, splits, and other distortions;
wherein the decorative image layer comprises one or more bonding sites distributed intermittently throughout the decorative image layer, each bonding sight being an area of the decorative image layer that is free of ink; and
wherein the one or more bonding sites are bonded directly to one of the tie layers, while the areas comprising ink remain unbonded to the one or more tie layers, such that the decorative image layer is discontinuously bonded to one of the one or more tie layers.

2. The laminated decorative panel as recited in claim 1, wherein:
the film of the decorative image layer comprises a glass transition temperature; and
each of the one or more tie layers comprises an activation temperature and an activation pressure.

3. The laminated decorative panel as recited in claim 2, wherein:
the glass transition temperature of the film is greater than or equal to the activation temperature; or
the activation temperature minus the glass transition temperature of the film is less than about 25% of the glass transition temperature of the film.

4. The laminated decorative panel as recited in claim 3, wherein:
the film comprises a bisphenol-A free copolyester; and
the one or more tie layers comprise a thermoplastic polyurethane.

5. The laminated decorative panel as recited in claim 2, wherein:
a heat distortion temperature of the printed film at the activation pressure is greater than or equal to the activation temperature; or
the activation temperature minus the heat distortion temperature of the film at the activation pressure is less than about 20% of the heat distortion temperature of the printed film at the activation pressure.

6. The laminated decorative panel as recited in claim 1, wherein at least one of the opposing outer substrates comprise one or more of, PMMA, or PETG.

7. The laminated decorative panel as recited in claim 1, wherein the laminated decorative panel is non-planar.

8. The laminated decorative panel as recited in claim 1, wherein the decorative image layer comprises layered ink applied to the film.

9. A thermoformed laminated decorative panel having a high-resolution decorative image layer including layered or cross-linked ink that is not cracked, split, or otherwise distorted, the laminated decorative resin panel comprising:
opposing outer substrates comprising resin-based substrates; and
a decorative image layer positioned between and laminated indirectly to each of the opposing outer substrates through respective tie layers, the decorative image layer comprising cross-linked or layered ink applied to a single layer of film; and
the tie layers being positioned between the decorative image layer and the opposing outer substrates;
wherein the decorative image layer comprises one or more bonding sites, each bonding sight being an area of the decorative image layer that is free of ink;
wherein the one or more bonding sites are bonded directly to one of the tie layers;
wherein the decorative image layer is laminated directly to the tie layers and indirectly to each of the opposing outer substrates via a thermoforming process and the cross-linked or layered ink is substantially devoid of visible cracks, splits, and other distortions;
wherein the activation temperature of the tie layers minus a glass transition temperature of the film is less than about 25% of the glass transition temperature of the film at the activation pressure; and
wherein the activation temperature of the tie layers minus the heat distortion temperature of the film at an activation pressure of the tie layers is less than about 20% of the heat distortion temperature of the film at the activation pressure of the tie layers.

10. A thermoformed laminated decorative panel having a high-resolution decorative image layer including layered or cross-linked ink that is not cracked, split, or otherwise distorted, the laminated decorative resin panel comprising:
opposing outer substrates comprising resin-based substrates; and
a decorative image layer positioned between and laminated directly to each of the opposing outer substrates, the decorative image layer comprising cross-linked or layered ink applied to a film;
wherein the ink applied to the film produces a translucent, high-resolution image that spans substantially all of the film with intermittent gaps therebetween, the intermittent gaps comprising one or more free areas within the image portion of the film that are free of cross-linked or layered ink, wherein the one or more free areas are bonded directly to one of the outer substrates; and
wherein the decorative image layer is laminated directly to each of the opposing outer substrates via a thermoforming process and the cross-linked or layered ink is substantially devoid of visible cracks, splits, and other distortions, the cross-linked or layered ink areas comprising printed areas of the film that remain unbonded to the opposing outer substrates.

11. The laminated decorative panel as recited in claim 10, wherein:
the film comprises a first side and a second side and the film of the decorative image layer is transparent or translucent;
the cross-linked or layered ink is discontinuously applied to both sides of the film such that the film comprises one or more bonding sites that are free of cross-linked or layered ink on both sides of the film; and
the one or more bonding sites that are free of cross-linked or layered ink on both sides of the film are respectively bonded directly to the opposing outer substrates.

12. The laminated decorative panel as recited in claim 9, wherein the film of the decorative layer is transparent.

13. The laminated decorative panel as recited in claim 9, wherein the laminated decorative panel is non-planar.

14. The laminated decorative panel as recited in claim 9, wherein the film of the decorative layer comprises a bisphenol-A free copolyester.

15. The laminated decorative panel as recited in claim 13, wherein at least one of the opposing outer substrates comprises PETG.

16. The laminated decorative panel as recited in claim 9, wherein at least one of the opposing outer substrates comprises PMMA.

17. The laminated decorative panel of claim 10, wherein the laminated decorative panel is non-planar.

18. The laminated decorative panel of claim 10, further comprising a tie layer positioned between the decorative image layer and at least one of the opposing outer substrates, wherein the decorative film layer is laminated to the at least one of the opposing outer substrates via the tie layer.

19. The laminated decorative panel of claim 18, wherein:
   the film of the decorative image layer comprises a glass transition temperature; and
   the tie layer comprises an activation temperature and an activation pressure.

20. The laminated decorative panel of claim 19, wherein a heat distortion temperature of the film at the activation pressure is greater than or equal to the activation temperature of the tie layer.

* * * * *